Aug. 14, 1923.
G. S. BOHART
1,464,802
DYE AND PROCESS OF MAKING SAME
Original Filed May 9, 1917
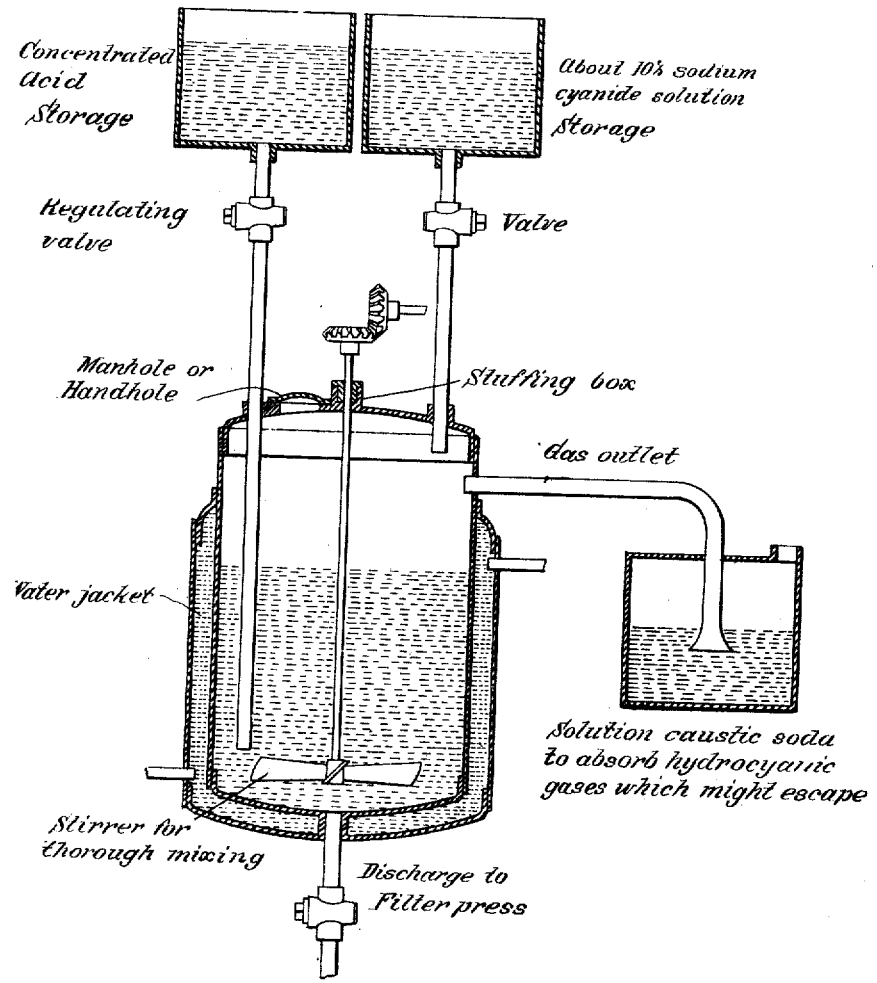

Patented Aug. 14, 1923.

1,464,8·2

UNITED STATES PATENT OFFICE.

GEORGE S. BOHART, OF WASHINGTON, DISTRICT OF COLUMBIA, ASSIGNOR TO GEORGE H. WHITTINGHAM, TRUSTEE, OF BALTIMORE, MARYLAND.

DYE AND PROCESS OF MAKING SAME.

Application filed May 5, 1917, Serial No. 167,451. Renewed June 2, 1923.

*To all whom it may concern:*

Be it known that I, GEORGE S. BOHART, a citizen of the United States, residing at the city of Washington, District of Columbia, have invented new and useful Improvement in Dyes and Processes of Making Same, of which the following is a specification.

This invention relates to a method of making azulmic acid, which I have found to be a valuable dye stuff, and to dyes and methods of making the same from said dye stuff.

A hydrocyanic acid solution, rendered slightly alkaline with sodium hydroxide or other alkali, at about room temperature (20° C.) undergoes spontaneous change in the course of several hours, resulting in the formation, in the solution, of a brownish black, apparently amorphous precipitate, insoluble in water and known as azulmic acid, the chemical constitution of which has not been satisfactorily established.

Azulmic acid is insoluble in water, but it is made soluble or dispersed or rendered colloidal by the addition to it of an alkali or the solution of an alkali in water, as for instance, a 5% caustic soda solution, and I have found that this solution of azulmic acid in water containing an alkali, has the property of dyeing cotton and other fabrics a variety of brown and reddish colors, depending on the concentration of the dye, which may be above or below a 1% solution.

If previous to its solution in an alkaline liquid, azulmic acid is treated with an oxidizing agent such as concentrated sulphuric acid, or a mixture of concentrated sulphuric acid and nitric acid ($HNO_3$), the fiber treated will be dyed a golden yellow.

As azulmic acid is not an article of ordinary commerce, one of the steps of my process is the production of azulmic acid on a commercial scale.

The drawing diagrammatically illustrates an apparatus suitable for that purpose.

*Step 1: Producing azulmic acid commercially.*

I have discovered a cheap, simple and direct way for the manufacture of azulmic acid on a commercial scale by the addition of sulphuric or other acid capable of decomposing cyanide, to a solution of a cyanide in water (a 10% solution of sodium cyanide has been found quite practical); the cyanide solution being slightly in excess of an equivalent of sulphuric acid. In practice the proportion of acid used is about 90% of that required to liberate all the hydrocyanic acid from the cyanide, (calculated from the known chemical equivalency of the acid and the cyanide) so that the acid is neutralized and some of the metallic cyanide remains as such. The excess cyanide (sodium cyanide for instance) furnishes the alkaline condition necessary for the spontaneous change from hydrocyanic to azulmic acid. The reacting substances, either by slow addition of acid or by cooling artificially are not allowed to rise in temperature above that of the room, say 20 degrees C., and are kept at a temperature calculated to prevent the excessive loss of hydrocyanic acid by volatilization. Advantages of this method are that the reactions are carried to completion in a single vessel, and this vessel may be constructed of iron, since at no time is a corrosive solution condition created.

The azulmic acid formed (composition unknown) is filtered and then washed free of the reaction solution with water. The yield is 85% or better of the theoretical, which latter is calculated to be the weight of hydrocyanic acid entering the reaction. The excess metallic cyanide remaining in the reaction solution may be recovered for further use by commonly known processes for such a recovery, such as evaporation, selective crystallization of impurities, etc.

Azulmic acid thus recovered is in the form of a brownish black, apparently amorphous precipitate, and insoluble in water.

*Step 2: Producing the dye.*—The next step in the process is to render the azulmic acid soluble, for which purpose some fairly strong alkaline solution is used, for instance a 5% caustic soda solution.

This solution of azulmic acid in water containing an alkali, constitutes a commercial dye producing various shades of brown, depending on the concentration or dilution of the dye solution.

*Step 3: Dyeing the fabric.*—The fabric to be dyed is immersed in an alkaline solution of azulmic acid either hot or cold, and allowed to remain five minutes more or less, until the cloth is impregnated, and saturated with the solution. Mechanical means, as rubbing and agitating may be employed to hasten the absorption of the dye solution. The fabric is then wrung free of an excess of the dye solution and may be washed with water to remove more effectively the excess.

*Step 4: Fixing.*—The fabric is then immersed in a dilute acid solution (say 1% sulphuric or acetic acid) which must impregnate the fabric. The acid bath serves to neutralize the alkaline dye solution, with which the cloth is impregnated, and the azulmic acid is rendered insoluble again and the color is thereby fixed. The cloth is then washed in water to remove the last traces of acid. By this fixing process the color is made more resistant to washing and bleaching agents.

Treating with metallic salts.

I have found that the azulmic acid dye is still further and more effectively fixed by immersing the fabric in an acid solution of a copper salt, as for instance a 5% copper sulphate solution with 1% sulphuric acid. This treatment with a copper salt may be an addition step after the acid fixing bath, or the copper salt may be dissolved in the acid bath. The copper solution renders the dye more sun-fast and resistant to laundry treatment. Other heavy metallic salts have similar effects to the copper treatment, as a cobalt nitrate solution, for example. Shades of color may be regulated by this treatment with metallic salts in solution. The excess of fixing solution is washed out with water.

Producing oxidized azulmic acid.

I have discovered that by treating the azulmic acid with concentrated sulphuric acid or sulphuric and nitric acid, or other oxidizing agents, and then washing the oxidized azulmic acid free of the oxidizing agent with water, a dye stuff is produced which is insoluble in water, but which is soluble or is rendered colloidal by treatment with an alkaline solution as a 5% sodium hydroxide solution for example. This oxidized azulmic acid dissolved in alkaline solution may be applied to fabrics exactly as described above in the use of azulmic acid, and is fixed with acids in an acid bath, as described. Metallic salts are effective in further fixing the oxidized azulmic acid. Yellow or golden shades of color are produced by the oxidized azulmic acid, varying with the concentration of the alkaline dye solution, and also with the choice of methods of fixing.

Having thus described my invention what I claim and desire to secure by Letters Patent is—

1. The method of making azulmic acid dye stuff which comprises adding to a solution of cyanide in water slightly less than an equivalent of an acid capable of decomposing the cyanide, the proportion of decomposing acid added being sufficient to cause the liberation of most of the hydrocyanic acid in the cyanide and yet leave in the solution sufficient metallic cyanide to furnish the alkaline condition necessary for causing the hydrocyanic acid liberated to change to azulmic acid, and freeing the azulmic acid formed from the reaction solution.

2. The method of making azulmic acid dye which comprises adding to a solution of cyanide in water slightly less than an equivalent of an acid capable of decomposing the cyanide, the proportion of decomposing acid added being sufficient to cause the liberation of most of the hydrocyanic acid in the cyanide and yet leave in the solution sufficient metallic cyanide to furnish the alkaline condition necessary for causing the hydrocyanic acid liberated to change to azulmic acid, freeing the azulmic acid form from the reaction solution, and dissolving the azulmic acid in an alkaline solution.

3. The method of making oxidized azulmic acid dye which comprises treating azulmic acid with an oxidizing agent and dissolving the oxidized azulmic acid in an alkaline solution.

4. The method of making oxidized azulmic acid dye which comprises treating azulmic acid with an oxidizing agent, washing out the oxidizing agent, and dissolving the oxidized azulmic acid in an alkaline solution.

5. A dye consisting of a solution of azulmic acid in water containing an alkali.

6. A dye comprising oxidized azulmic acid dissolved in an alkaline solution.

In testimony whereof I have hereunto set my hand in the presence of two subscribing witnesses.

GEORGE S. BOHART.

Witnesses:
JOHN H. HERRING,
W. W. HEALEY.